United States Patent [19]

Margraf

[11] 3,930,000

[45] Dec. 30, 1975

[54] SILVER-ZINC ALLANTOINATE COMPOSITIONS AND METHOD OF KILLING BACTERIA AND FUNGI THEREWITH

[75] Inventor: Harry W. Margraf, Clayton, Mo.

[73] Assignee: Washington University, St. Louis, Mo.

[22] Filed: May 9, 1974

[21] Appl. No.: 468,228

Related U.S. Application Data

[62] Division of Ser. No. 153,820, June 16, 1971, Pat. No. 3,856,805.

[52] U.S. Cl. .................. 424/245; 424/28; 424/289; 424/290; 424/DIG. 13
[51] Int. Cl.² A01N 9/00; A61K 31/28; A61L/13/00 A61K 31/555
[58] Field of Search ............ 260/299; 424/245, 289, 424/290

[56] References Cited
UNITED STATES PATENTS

| | | | |
|---|---|---|---|
| 2,336,131 | 12/1943 | Schaffer | 260/299 |
| 2,761,867 | 9/1956 | Mecca | 260/299 |
| 3,632,596 | 1/1972 | Mecca | 260/299 |
| 3,830,908 | 8/1974 | Klippel | 424/245 X |

OTHER PUBLICATIONS

Chem. Abs. Vol. 47, 1943 p. 4843c.
Chem. Abs. Vol. 70, 1969 Abs. Nos. 77968 & 77969.

*Primary Examiner*—Albert T. Meyers
*Assistant Examiner*—A. P. Fagelson
*Attorney, Agent, or Firm*—James R. Haller; H. Dale Palmatier

[57] ABSTRACT

A silver zinc allantoinate composition and method for making it. The silver zinc allantoinate is prepared by a novel process producing high yields above 90 percent and the resultant silver zinc allantoinate has a low water solubility of about 0.02 percent at 25° C. providing for slow release of silver and zinc ions in medication. The silver zinc allantoinate can be incorporated into various carriers such as ointment, creams, lotions, aerosol sprays, and the like, for topical application for control of bacteria and fungi.

8 Claims, No Drawings

SILVER-ZINC ALLANTOINATE COMPOSITIONS AND METHOD OF KILLING BACTERIA AND FUNGI THEREWITH

This application is a division of U.S. application Ser. No. 153,820, filed June 16, 1971, now U.S. Pat. No. 3,856,805.

SUMMARY OF THE INVENTION

Silver allantoinate has been disclosed previously for medicinal purposes in Schaffer U.S. Pat. No. 2,336,131 for its general germicidal and healing qualities. The silver allantoinate [$C_4H_5O_3N_4AgOH$] prepared by the process of the Schaffer Patent has a low yield of 25 percent and a relatively high solubility of 0.4 percent at 25° C.

It is the object of this invention to provide a silver zinc allantoinate composition of a high degree of solubility in which the beneficial and individual effects of the silver, zinc and allantoin are combined in a product having a slow release and high degree of bacteriacidal, fungicidal and healing effectiveness. The novel process of this invention derives from the preparation of silver zinc allantoin as a novel composition with a high yield above 95 percent and provides a silver zinc allantoin composition having a low water solubility and a slow release of 0.02 percent at 25° C.

The silver zinc allantoinate complex has a wide range of application against gram positive, gram negative bacteria and for topical application on infected tissue. It is particularly useful for topical application to burn wounds, but is not restricted to such treatment. In burn wound healing and antiseptic prophylaxis, it portrays superior bactericidal qualities without skin discoloration which is caused by other silver compounds. The silver-zinc-allantoinate composition when used in burn wounds is employed without serious loss of electrolytes and can be employed without the very close control required, for example, in the use of the 0.5 percent silver nitrate treatment. The cost of the silver-zinc-allantoin composition is relatively low and incorporation into a carrier is easily facilitated using common ointments, creams, lotions and aerosol sprays or powders. The silver-zinc-allantoinate-complex is produced in the form of an odorless stable white powder. It must be protected from heat and moisture.

DESCRIPTION OF THE INVENTION

The silver-zinc-allantoin-complex also referred to herein as silver-zinc-allantoinate is prepared as will be more fully set forth below by reacting silver nitrate with allantoin (5-Ureideohydantoin) in the presence of zinc sulfate and ammonia. The resulting complex contains both silver and zinc in the form of a stable white powder as the silver-zinc-allantoin complex. This complex combines the effect that the individual silver and zinc and allantoin components have individually and, in addition, demonstrates that the combined effect exceeds the individual effectiveness of the individual components with respect to their anti-microbial (anti-bacterial and anti-fungal) and wound healing properties. The silver-zinc-allantoin-complex may be added in micronized powder form to any number of water soluble creams, lotions, ointment bases or aerosol sprays, the components of which are compatible with the silver and zinc in concentrations as low as 0.3 to as high as three grams per one hundred grams of the carrier, such as the ointment base. The low water solubility in the order of 0.02 percent at 25° C of the silver-zinc-allantoin complex, permits the use of a higher than actually necessary concentration, which has the advantage of being capable not only to control existing topical bacterial and fungal invasion, but also to prevent such occurrence in most cases, before it may become apparent to the hospital personnel. The low solubility further acts to maintain a reservoir to provide for the slow release of the silver-zinc-complex to provide its bactericidal, fungicidal and healing effects over a long period of time.

The use of zinc provides for specific anti-fungal properties and contributes to biochemical processes that are concerned with healing, i.e., the regeneration of destroyed tissue cells.

Silver is employed for its antimicrobial properties to provide for the inhibition of growth of a large number of bacteria and fungi and prevent bacterial invasion which is essential for extensive injuries to heal. The effectiveness of the silver is such than even very small amounts can inhibit microbial growth. Silver nitrate, the most common compound of silver previously employed, is used as an antimicrobial agent extensively, and has been successfully employed as an 0.5 percent solution for the effective treatment of severe burns. Disadvantages of the use of silver nitrate exist, however, in loss of electrolytes in the patient and excessive silver staining, and the use of silver nitrate requires close supervision by the attending physician. The inclusion of zinc in the silver-zinc-allantoinate complex has the purpose of stabilizing the silver in the complex and also reinforcing the effectiveness of the silver through the excellent antifungal properties of the zinc, while at the same time, together with allantoin, promoting the healing of wounds.

The silver-zinc-allantoinate, besides providing antibacterial and antifungal properties in the treatment of burns, and wounds and other infected areas, also acts as a cell proliferant and healing agent, and quite importantly acts as a chemical debrider of necrotic tissue and a prophylactic topical agent in the prevention of burn sepsis. The silver-zinc-allantoin complex produced in the form of a white powder is stable, has a long shelf life and is relatively unaffected by exposure to light besides providing low water solubility, so that when used topically and with dressings, there is very little staining in contrast with the highly ionizable compounds of silver, such as silver nitrate, silver acetate, silver lactate and the like.

The silver-zinc-allantoin complex may be used in desired proportions with amylopectene and other starch derivatives, with zinc stearate or any other compatible solid diluent to form highly effective antiseptic wound powders or surgical scrubs. It also represents an effective surface antiseptic in contact with plastic materials such as polyethylene, polypropylene, dacron, nylon and others.

The silver-zinc-complex may be employed to provide permanently antiseptically active surfaces on materials such as cellulose, silk, polyester, nylon and the like where used as dressings, drapings, covers, surgical sutures and in other instances. These materials must be sterile in medical use over a long period of time, and when treated they assume self-sterilizing properties.

The binding capacity of silver to such materials has been well established in the past, and silver nitrate solutions have been employed to render them bacteriostatic. Through the use of the silver-zinc-allantoin complex a much greater antiseptic activity can be provided at lower cost to confer the desired antimicrobial activity at the time of need (i.e., in the presence of bacteria and fungi in humidity only), while during dry storage no loss of activity occurs. The amount of silver utilized in the silver-zinc complex is self-limiting to the amount of bacterial or fungal protein that needs binding for destruction in the antimicrobial process, the only other element being water necessary to create the ionic environment for activity. In application, the otherwise stable silver-zinc complex is dissolved in alkali or may be applied as a powder to form the treatment solutions of any desired strength and efficiency.

The silver-zinc complex further provides a stable or constantly effective agent without excessive concentration of silver and zinc in application to burn wounds and the like through the low solubility of the complex. The depletion of body salts by silver ions and loss of electrolytes is reduced to a minimum and the electrolyte balance is maintained readily in burn patients.

Further, in the silver-zinc-allantoin complex, the active ingredients, namely, the silver, zinc and allantoin are non-toxic in the concentrations employed.

Allantoin has a long history of therapeutic value which is closely connected with its natural predecessor "comfrey root." Chemically, allantoin is a uric acid derivative (diureide of glyoxyllic acid; also: 5-ureidohydantoin or glyoxyldiureide) and is commercially available at low cost.

As a silver ion ($Ag+$) approaches another ion or molecule X, the more loosely held electrons can be attracted toward X (polarization) and perhaps even shared to some extent with X (formation of partially covalent bond). As a result of this added attraction, the silver ion forms many complex ions and many precipitates.

Silver is reluctant to combine with oxygen. The oxide is made not by direct union of the elements, but by precipitation. The solubility of silver oxide is abnormally large in strongly basic solutions. This increase in solubility has been attributed to the reaction of $Ag_2O$ as an acid to give $AgO^-$ or $Ag(OH)_2^-$, a behavior which is called amphoteric. Together with allantoin, another amphoteric substance (forms alkali salts as a weak acid and forms salts with acids behaving as a weak base), it may therefore form both, salts and complexes.

The antibacterial action of inorganic silver salts and of silver-protein is due to free silver ions. Micro-organisms take up silver ions readily and the proteins of bacterial protoplasm are precipitated. The formed silver proteinate continues to liberate silver ions within the bacterial cell, which are capable of reacting with critical macromolecules of the cell.

Silver is known to form complexes with polynucleotides. The silver ion combines in equimolar ratio with quanosine 3' (2')-monophosphate, inosine, inosine 5' monophosphate and theophylline. It forms also a complex with riboflavin at pH 7.

Silver-zinc-allantoin complex compared to inorganic silver salts such as the nitrate or to organic salts such as the lactate has only a fraction of their solubility in water, i.e., in the absence of strong base or acid ionization is limited. Despite this, when corresponding amounts of silver in their respective anionic combination were tested in vitro as to their bacteriostatic effectiveness, i.e., their ability to inhibit bacterial growth of common pathogenic organisms, the silver-zinc-allantoinate was found to be very effective.

The effectiveness of silver-zinc-allantoinate appears to depend on the oligodynamic action of a limited number of silver and zinc ions, set free from complex binding only at a slow release rate due to its low solubility which coresponds to the utilization through chemical binding and absorption to bacteria and body protein. The maintenance of an equilibrium, i.e., a constant silver and zinc ion concentration is assured by the presence of sufficient complex from which, upon demand, active metal ions can be obtained. By this action loss of silver or zinc is minimized while its high rate of effectiveness is established.

Various forms of silver, including the pure metal, certain of its derivatives and colloidal suspensions thereof have been known as antiseptic or germicidal agents for several centuries.

The bactericidal powder of metallic silver is known for its oligodynamic activity, such term coined to describe the lethal properties of any metal which exhibits antimicrobial properties even in minute concentrations. Metallic silver, i.e., silver in non-ionized form, apart from possessing antiseptic properties, is also non-toxic. Accordingly, it has found practical application as an antiseptic. It has been used in various forms, most often as the colloidal suspension. In addition, silver has been used in form of various salts for bactericidal purposes, i.e., silver nitrate, silver citrate, silver lactate, silver picrate, silver chloride and silver proteinates, to mention a few.

A large number of compounds and complexes of silver are chemically known and have found use as analytical, catalytical and sometimes antimicrobial agents. In the case of the latter, many of these are not suitable for use, topically or otherwise, in humans because of either extremely adverse physical properties or the toxicity of the associated anion itself. For instance, silver chloride has a very slight water-solubility only but on exposure to light, it immediately turns black. The sodium-argento-thiosulfates on the other hand are very soluble, most effective as antibacterial solutions, but they have proven to be rather toxic even when applied topically.

Furthermore, silver nitrate, despite its use in concentrations that vary from 0.5 to 10 percent or more, has corrosive and irritating properties. The nitrate ion has been found to convert to the nitrite ion, especially in the presence of bacteria, and as such it is toxic and may lead to methemoglobinemia, which may be fatal, especially in patients of tender age.

The high solubility of the silver nitrate, in addition, becomes dangerous because of the ability of the silver ions to deplete the body of electrolytes, i.e., negatively-charged ions such as the chloride and with it carry other, life-important elements such as sodium, potassium, magnesium, calcium and the like.

Accordingly, close supervision of burn patients treated with silver nitrate is necessary. Use, therefore, is limited to larger, well-equipped medical centers and the use on casualties in the field is impossible. Repeated microchemical analyses are needed for effective therapeutic control of the patients exposed to solutions of silver nitrate. The same objections apply to the use of certain other, water-soluble silver salts, such as the lactate, acetate, etc., despite the more physiological character of these respective anions.

The bactericidal properties of silver in its many forms have been theoretically attributed to the micro-solubility of the metal in water with the consequent production of active metal ions and the adsorption thereof by the bacteria and resultant protein coagulation. It is known that metallic silver is less active, for example, than its salts and that the chemically pure metal is completely inactive.

Extensive research into the mode of action of silver as a germicidal agent has resulted in a number of theoretical considerations which are described below. The bacteriostatic and bactericidal effects of silver or zinc are closely related to the chemical and physical behavior and not to the actual number of metal ions. Free metal ions are effective bacteriologically as long as there is a sufficiently large reserve or deposit of non-ionized metal available to maintain a constant silver or zinc ion concentration. Here the low solubility of the silver zinc allantoinate composition prepared by the process of this invention is highly advantageous. The concentration limits at which a silver compound can kill a certain number of microorganisms depends on its silver content and is proportional to it, and also on the number and power of adsorption of different microorganisms. The rate with which silver ions that act upon and are lost to the bacteria are replaced, determines the rate at which bacteria are destroyed. Silver in the various silver compositions is dissolved by the products of bacterial metabolism, more readily by some than by the products of others. Lactic acid is one of the products which yields silver lactate while ammonia is another which yields other silver complexes.

The antiseptic effect of the silver in the composition can be seen to take place in two distinct partial steps. In the first the silver ions react with the life important component of the microorganism, while the second is the reaction of silver ion with components in the system, such as sodium chloride, protein and the like. The first step takes place with all silver compounds or complexes in an identical manner and in the treatment no influence or choice can be exercised. In the second step, it is known that a reaction occurs at different rates with different compounds and on this rate depends the bacteriological effectiveness.

In the presence of different proteins, the distribution of silver depends on the quantity and the respective binding capacity of the proteins. Thus, there is a selective effectiveness of silver, depending on the presence or absence of certain specific organisms, i.e., bacteria, fungi, or viruses. It has been proven that silver binds with relative ease to albumin but not to globulin. The silver-protein binding is reversible in the presence of compounds for which silver has an even greater advantage, for example, compounds containing a -SH(sulfhydril) grouping.

The existing equilibrium between ionized and complexed silver or zinc greatly influences the antimicrobial effectiveness. In organo-metallic combinations in which the metal atom has entered the more or less stable structure or organic compounds, the specific effect of the metal disappears and the organo-metallic molecule, as a whole, determines the effect. Silver-salvarsan and silver-sulfadiazine are typical examples of this behavoir. On the other hand, compounds such as the argentamines, despite their organic component, belong to the class of complex salts. Silver allantoinate is another such example.

Considering silver-zinc-allantoinate a chelate of a nitrogenous base (Allantoin = 5-Ureidohydantoin) and ionic silver and zinc, the concept that it acts by distortion of the DNA structure and by alteration of the microbial DNA function, thus inhibiting cell proliferation, must be considered most likely.

The silver-zinc-allantoin complex is prepared by the process set forth in the following example:

EXAMPLE I

Into 2 liters (2000 cc) of boiling distilled water place:

ALLANTOIN 100 parts
ZINC SULFATE, heptahydrate 100 parts = 22.7 parts of $Zn^{++}$ to form a true solution. With constant stirring add SILVER NITRATE 100 parts (200 parts of a 50 percent aqueous solution). Remove from heat and still with stirring add slowly, in small portions AMMONIA, 28 percent solution, until a pH of 7.5 is reached. This requires approximately 90 to 95 cc. A heavy white precipitate forms which is filtered off by suction. The mother liquor is discarded. Small amounts of unreacted silver may be recovered by precipitation as silver chloride, using dilute hydrochloric acid. The precipitate is washed with distilled water, approximately 4°C cold and containing 1% by volume of hydrogen peroxide ($H_2O_2$). It is then air dried and placed into a 37°C incubator for final drying. The white dry powder is passed through a powder mill to obtain a micronized powder (approximately 200 mesh particle size). The yield approximates 180 parts, which is 96 percent of the theory.

| Analysis: | SILVER | 34.3% |
|---|---|---|
| | ZINC $(OH)_2$ | 15.8% |
| | ALLANTOIN | 49.9% |

The silver-zinc-allantoin compllex is soluble in water in the amount of approximately 0.04 per 100 cc. at 25°C. The general formula is: $(C_4H_5O_3N_4Ag)_2: Zn(OH)_2$ with a structural, tentative formula of:

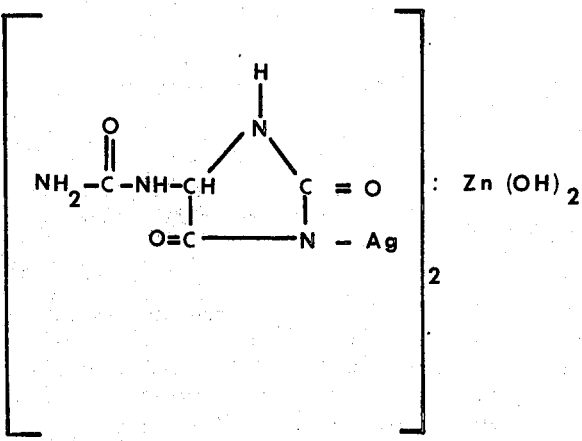

The silver-zinc-allantoinate has been used in ointment form to demonstrate the bacteriostatic effectiveness against various organisms. The effectiveness has been demonstrated in the modified testing procedure of Reddish, using the procedure outlined in "Antiseptics, Disinfectants, Fungicides and Chemical and Physical Sterilization", Lea & Febiger, Philadelphia 1954, pp. 342–343. In the silver-zinc-allantoinate ointment the allantoin is present in the amount of about 1%, silver about 0.85 percent and zinc 0.15 percent. The results of the testing procedure utilizing values representing averages of at least two determinations are shown in the table below at various percentages of silver ion.

| Organism | 0.04% | 0.2% | mm INHIBITION of growth 0.4% | 0.6% | 0.8% | 1.0% | 2.0% | 4.0% Ag$^+$ conc. |
|---|---|---|---|---|---|---|---|---|
| Staph.aureus | 0 | 2 | 3 | 3 | 4 | 4 | 7 | 7 |
| Pseud. Aerug | 3 | 3 | 4 | 5 | 5 | 5 | 7 | 7 |
| Sal. choleras | 3 | 3 | 4 | 4 | 4 | 6 | 8 | 8 |
| E. coli | 1 | 2 | 3 | 3 | 5 | 5 | 5 | 5 |
| Ent. aerogenes | 1 | 2 | 2 | 2 | 4 | 4 | 4 | 5 |
| Candida albicans | 2 | 3 | 3 | 4 | 6 | 7 | 8 | 8 |

The silver-zinc-allantoin complex prepared by the process of Example I is advantageously incorporated in an antiseptic burn cream as set forth in the following examples.

EXAMPLE II

| 1. | CETYL ALCOHOL | 400 Gm | |
|---|---|---|---|
| | GLYCEROL | 200 ml | MELT AT 75°C |
| | PROPYLENE GLYCOL | 40 ml | |
| | POLYETHYLENE GLYCOL 600 | 80 ml | |
| | SQUALANE | 20 ml | |
| | MINERAL OIL, light (incl. dye*) | 20 ml | |
| 2. | Distilled water | 2300 ml | |
| | ALLANTOIN | 25 Gm | |
| | SODIUM LAURYL SULFATE | 20 Gm | |
| | | | heat until a clear solution |
| 3. | TRIETHANOLAMINE | 35 Gm | |
| | SILVER-ZINC-ALLANTOIN COMPLEX | 55 Gm | |
| | DISTILLED WATER | 110 ml | |

Stir 2. into 1., wash 3 into 1+2, and stir until cold, add HYDROGEN PEROXIDE, 1% aqueous solution 500 ml.

Stir again and fill into cream jars.

Analysis:
| | Silver, approx. | 0.5% |
|---|---|---|
| | Zinc, approx. | 0.15% |
| | Allantoin | 1.4% |
| pH: 7.8 | | |

*Scarlet Red, dissolved 500 mg in 500 ml Mineral Oil, light. Use 20 ml and add to mixture 1.

Furthermore: Silver-zinc-allantoinate may be incorporated in micronized powder form directly into any suitable ointment base, such as USP hydrophylic ointment base. The addition of a suitable* amount of 1% aqueous solution of hydrogen peroxide, for better shelf life is recommended.
* proportioned to amount used in Example II

EXAMPLE III

| Mixture 1: | Stearic Acid | 350 Gm |
|---|---|---|
| | Stearyl Alcohol | 100 Gm |
| | Cetyl Alcohol | 50 Gm |
| | Myristyl Alcohol | 50 Gm |
| | Petrolatum USP | 300 Gm |
| | Squalane | 50 Gm |
| | Mineral Oil, light (incl. Scarlet Red) | 50 Gm heat in water bath to melt |
| Mixture 2: | 2-Amino-2-methyl -1, 3-propanediol | 108 Gm |
| | Silver-Zinc-Allantoinate | 108 Gm |
| | Distilled Water | 600 ml |
| add to 1, mix to form a paste (30 minutes) | | |
| Mixture 3: | Propylene Glycol | 150 ml |
| | Polyethylene Glycol 600 | 700 ml |
| add to 1+2 | | |
| Mixture 4: | Distilled Water | 4000 ml |
| | Allantoin | 40 Gm |
| | Sodium Lauryl Sulfate | 10 Gm | filter, and add to 1 + 2 + 3. Stir until cold, add 1% hydrogen peroxide, 200 ml and once more stir for at least 30 minutes.

| Content: | Allantoin approx. | 1.4% |
|---|---|---|
| | Silver approx. | 0.55% |
| | Zinc (OH)$_2$ approx. | 0.25% |
| pH: 7.2 | | |

The silver zinc allantoinate prepared by the process of this invention is very advantageous in a silver burn cream or ointment. These advantages are typified by promotion of burn healing and lack of retardation coupled with a low sensitization index. Further, there is a low index of irritation and the silver allantoinate is non-dehydrating. It has good pharmaceutical properties or pharmaceutical elegance in that it lends itself to incorporation into carriers, such as an ointment, cream, lotion and the like, especially those which are non-greasy. The shelf life is of prolonged durability and it is compatible with other chemical ingredients. Further, despite its low solubility, it shows an efficient release of the silver-zinc-allantoinate as a therapeutic agent at the site of application to the burn wound. Because of its physical nature and non-greasiness, it is easily removed with water. It further is desirable in chemical formulating and ease of compounding since it can be used as a single ingredient along with the carrier. In application to the burn area, it may be applied with minimum sensation of pain during the application and in the treatment. The ease of procurement of the ingredients used in the process and their relatively low cost make it desirable for pharmaceutical use.

The advantages of treating burn wounds with the burn ointment or cream exist in that required supplemental oral salt intake is much less than when 0.5% aqueous solutions of silver nitrate are used in that there is practically no electrolyte depletion. Also, methemoglobinemia does not occur, and the topical treatment with the burn cream is at least as effective as the employment of 0.5% silver nitrate solution in controlling burn wound infection. Further, staining of floors, walls and bed clothing and the skin is greatly minimized when the silver-zinc-allantoinate cream is employed as compared when silver nitrate solution is used.

The treatment of the burn wound is instituted by removing all loose skin from the burn wound surface which requires excision of all blisters and loose skin and wiping off of non-blistered skin which overlies the burns. Swab wipings for bacterial culturing are obtained from the various parts of the wound at this time. All grease and ointments that may have been applied to the wound elsewhere are removed. Occasionally immersion in a bath of warm Locke's solution or other appropriate solution for a period of time is necessary to accomplish the removal of all such ointments.

With the burn wound thus prepared, the silver-zinc-allantoinate burn cream is applied over the entire burn surface. Following the liberal application of the cream, sterile gause dressings are applied over the ointment. A stockinette may then be wrapped snugly over the dressings to hold them in place.

Dressings are changed periodically, when the burn wound is inspected carefully and all loose eschar or excess ointment is removed. The burn cream ointment is water miscible so most of it may come off with the dressings. The burn wound is then again covered with ointment and dressing as previously described. Bacterial cultures of the burn wounds are secured two or three times weekly and quantitative culture counts determined. Due to the silver-zinc-allantoinate burn cream's effectiveness, dressing changes can be made less frequent, i.e., only every twenty-four or forty-eight hours. This is of considerable advantage to both the patient and the burn unit personnel. The dressings and the debridement are continued until the wounds heal or are ready to receive cutaneous autographs. The silver and zinc allantoin complex burn cream in use is summarized in the analysis set forth below for the treatment of second and third degree burns.

Fourteen patients with second and third degree burns covering 15–45 percent of body surface were thus treated. In addition one patient, a fifty-six year old man suffering from burns covering 82 percent of body surface was treated for 35 days before he died from complications other than sepsis.

The silver-zinc-allantoin complex burn cream was found to be an effective agent to prevent burn wound colonization by bacteria and fungi. It was tolerated well by most patients and no complications attributable to the use of this cream were encountered. In contrast to the 0.5% silver nitrate solution which has found widespread favor as a prophylactic agent against burn wound infection, this cream does not cause loss of electrolytes in the patents exposed to it.

The effect of the zinc has not been completely evaluated during the relatively short period of use; nevertheless, there has been a complete absence of fungal growth which may well have been due to its presence. No signs of disturbed zinc-metabolism have been observed, despite the reported hypozincemia and hyperzincuria in patients with severe burns. (Nielsen and Jemec: Zinc Metabolism in Patients with Severe Burns. Scand. J. Plast. Reconstr. Surg. 2:47–52, 1968).

The new cream has only limited staining properties if used away from direct sunlight. The limited exposure to ionic silver has resulted in only trace absorption in patients treated as long as three months; plasma silver levels were below the detectable limit, urinary excretion of the metal has been within trace amounts. No permanent discoloration of the skin (Argyria) has been noted in any of the patients thus treated.

Various changes and modifications may be made in this invention as will be readily apparent to those skilled in the art. Such changes and modifications are within the scope and teaching of this invention as defined by the claims appended hereto.

What is claimed is:

1. A method of killing bacteria and fungi in an infected area comprising topically applying to the infected area an effected amount of silver-zinc-allantoinate of the formula $(C_4H_5O_3N_4Ag)_2 : Zn(OH)_2$.

2. The method of claim 1 in which the topical application is to a skin burn area.

3. The method of claim 1 in which the silver-zinc-allantoinate is suspended in an inert carrier.

4. The method of claim 1 in which the carrier also contains free allantoin.

5. A pharmaceutical composition comprising a bacteriostatically effective amount of silver-zinc-allantoinate of the formula $(C_4H_5O_3N_4Ag)_2 : Zn(OH)_2$ in a pharmaceutical carrier.

6. The composition of claim 5 in which silver-zinc-allantoinate is present in an amount of 0.3 to 3 grams per 100 grams of carrier.

7. A pharmaceutical composition comprising a bacteriostatically effective amount of silver-zinc-allantoinate of the formula $(C_4H_5O_3N_4Ag)_2 : Zn(OH)_2$ incorporated as a powder in a water-soluble pharmaceutical ointment base.

8. The composition of claim 7 also including free allantoin.

* * * * *

UNITED STATES PATENT OFFICE
CERTIFICATE OF CORRECTION

Patent No. 3,930,000        Dated December 30, 1975

Inventor(s) Harry W. Margraf

It is certified that error appears in the above-identified patent and that said Letters Patent are hereby corrected as shown below:

Claim 1, line 28 replace "effected" with -- effective --.

Signed and Sealed this sixteenth Day of March 1976

[SEAL]

*Attest:*

RUTH C. MASON
*Attesting Officer*

C. MARSHALL DANN
*Commissioner of Patents and Trademarks*